United States Patent
Cran

(10) Patent No.: US 11,853,932 B2
(45) Date of Patent: Dec. 26, 2023

(54) INTERMEDIATED COMMUNICATION IN A CROWDSOURCED ENVIRONMENT

(71) Applicant: BugCrowd, Inc., San Francisco, CA (US)

(72) Inventor: Jonathan Cran, San Francisco, CA (US)

(73) Assignee: Bugcrowd Inc., San Francisco, CA (US)

( * ) Notice: Subject to any disclaimer, the term of this patent is extended or adjusted under 35 U.S.C. 154(b) by 203 days.

(21) Appl. No.: 15/847,608

(22) Filed: Dec. 19, 2017

(65) Prior Publication Data

US 2019/0188626 A1    Jun. 20, 2019

(51) Int. Cl.
   *G06Q 10/0631*    (2023.01)
   *H04L 9/40*    (2022.01)
   *G06Q 50/00*    (2012.01)

(52) U.S. Cl.
   CPC .......... *G06Q 10/063114* (2013.01); *G06Q 10/063112* (2013.01); *G06Q 50/01* (2013.01); *H04L 63/1433* (2013.01)

(58) Field of Classification Search
   None
   See application file for complete search history.

(56) References Cited

U.S. PATENT DOCUMENTS

| | | |
|---|---|---|
| 8,812,711 B2 | 8/2014 | Schloming |
| 8,950,007 B1 * | 2/2015 | Teal ................. G06F 21/57 726/30 |
| 9,015,847 B1 | 4/2015 | Kaplan et al. |
| 9,223,978 B2 | 12/2015 | Kraemer |
| 9,413,780 B1 | 8/2016 | Kaplan et al. |
| 9,473,524 B2 | 10/2016 | Kaplan et al. |
| 10,243,904 B1 * | 3/2019 | Wescoe ................. H04L 51/12 |
| 10,380,516 B1 * | 8/2019 | Kislaki .......... G06Q 10/063114 |
| 10,601,856 B1 * | 3/2020 | Natanzon .............. G06F 21/577 |

(Continued)

FOREIGN PATENT DOCUMENTS

EP    2284757 A1    2/2011

OTHER PUBLICATIONS

Hackerone.com, "Policy Versions," Dec. 7, 2016, Hackerone (Year: 2016).*

(Continued)

*Primary Examiner* — Sara Grace Brown
(74) *Attorney, Agent, or Firm* — Asif Ghias

(57) ABSTRACT

Techniques for improving communication and expectation setting between various parties/communities of a crowdsourced platform are disclosed. The platform is used for reporting issues in a target system, program or product. A customer/subscriber entity enters a target brief in the platform. In response, a researcher enters a submission in the system. If the submission is valid, it is presented to the customer and a response-time or service level agreement (SLA) timer is started. If the customer agrees with the submission, it is marked as complete and the researcher is paid. If the customer disputes the submission, a third-party intervenes and the timer is paused until dispute resolution. If the submission requires more information the researcher is requested accordingly and the timer is reset. If at any point, the timer expires, the parties are notified and the submission is closed.

13 Claims, 4 Drawing Sheets

(56) References Cited

U.S. PATENT DOCUMENTS

| | | | |
|---|---|---|---|
| 10,915,636 B1* | 2/2021 | Kaplan | G06F 21/577 |
| 2003/0009696 A1 | 1/2003 | Bunker et al. | |
| 2003/0083942 A1 | 5/2003 | Mallon et al. | |
| 2004/0006704 A1 | 1/2004 | Dahlstrom et al. | |
| 2008/0162368 A1* | 7/2008 | Rogers | G06Q 30/00 705/80 |
| 2008/0222731 A1 | 9/2008 | Dowd et al. | |
| 2010/0100930 A1* | 4/2010 | King | H04L 63/1433 726/1 |
| 2012/0123959 A1 | 5/2012 | Davis et al. | |
| 2013/0254880 A1 | 9/2013 | Alperovitch et al. | |
| 2015/0058680 A1* | 2/2015 | Kortti | G06F 11/3684 714/47.2 |
| 2015/0082442 A1* | 3/2015 | Chauhan | H04L 67/02 726/25 |
| 2015/0254596 A1 | 9/2015 | Nayar et al. | |
| 2016/0019549 A1* | 1/2016 | Maizuddin | G06Q 30/016 705/7.42 |
| 2017/0013008 A1* | 1/2017 | Carey | H04L 63/1433 |
| 2017/0155769 A1* | 6/2017 | Kan | G06Q 10/06311 |
| 2017/0220972 A1* | 8/2017 | Conway | G01D 21/00 |
| 2017/0244743 A1* | 8/2017 | Key | H04L 63/1425 |
| 2018/0034846 A1* | 2/2018 | Marquez | H04L 63/1433 |
| 2018/0165720 A1* | 6/2018 | Barkeloo | G06F 3/0481 |
| 2018/0211724 A1* | 7/2018 | Wang | G16H 40/20 |
| 2018/0219900 A1* | 8/2018 | Gorodissky | H04L 63/20 |
| 2018/0365628 A1* | 12/2018 | Bhaskaran | G06Q 10/06314 |
| 2019/0005428 A1* | 1/2019 | Kras | H04L 63/1483 |
| 2019/0068631 A1* | 2/2019 | Ashkenazy | H04L 63/1433 |
| 2019/0102723 A1* | 4/2019 | Gupta | G06N 3/08 |
| 2020/0027096 A1* | 1/2020 | Cooner | H04L 67/12 |

OTHER PUBLICATIONS

Bugcrowd Researcher Success, "How and When to Effectively Escalate a Submission," Oct. 5, 2016, URL < https://www.bugcrowd.com/blog/how-and-when-to-effectively-escalate-a-submission/ > (Year: 2016).*

Bugcrowd, "Bug Bounty KPIs: Response Time," Oct. 27, 2016, URL <https://www.bugcrowd.com/blog/bug-bounty-kpis-response-time/> (Year: 2016).*

Screen captures from YouTube video entitled "AppSec EU15—Jonathan Cran—Hard Knock Lessons On Bug Bounties," uploaded on Jun. 9, 2015 by "OWASP Foundation," [retrieved from the internet on Sep. 25, 2023], URL: < https://www.youtube.com/watch?v=VSk2-XmAvA0 > (Year: 2015).*

Cert, "Vulnerability Disclosure Policy", https://www.cert.org/vulnerability-analysis/vul-disclosure.cfm?, Oct. 12, 2016, Pittsburgh, USA.

Christey, Steve et al., "Responsible Vulnerability Disclosure Process, draft-christey-wysopal-vuln-disclosure-00.txt", Internet Engineering Task Force, Feb. 1, 2002, Bedford, MA, USA.

ISO, "Information technology—Security techniques—Vulnerability disclosure", 1st. Edition, Feb. 15, 2014, Reference No. ISO/IEC 29147(E), Switzerland.

Atoza, Thomas D, "Microtask Programming: Building Software with a Crowd", Oct. 5, 2014, UC Irvine, Irvine, CA, USA.

Microsoft, "Coordinated Vulnerability Disclosure", https://technet.microsoft.com/en-us/security/dn467923.aspx, Oct. 12, 2016, USA.

Mozilla, "Handling Mozilla Security Bugs", http://Mozilla.org/en-US/about/governance/policies/security-groups/bugs/, Oct. 12, 2016, USA.

Packetstormsecurity, "Full Disclosure Policy(RFPolicy) v2.0", https://dl.packetstormsecurity.net/papers/general/rfpolicy-2.0.txt, Oct. 12, 2016, USA.

Rapid7, "Vulnerability Disclosure Policy", https://www.rapid7.com/disclosure.jsp, Oct. 12, 2016, Boston, MA, USA.

Sandusky, Robert J, "Negotiation and the Coordination of Information and Activity in Distributed Software Problem Management", ACM, Nov. 9, 2005, Sanibel Island, FL, USA.

Schmidt, Kjeld, "Coordination mechanisms: Towards a conceptual foundation of CSCW systems design", The Journal Of Collaborative Computing, 1996, vol. 5.

Wang, Huaimin, "TRUSTIE: A Software Development Platform for Crowdsourcing", National Laboratory for Parallel and Distributed Processing, School of Computer, Changsha, China.

Zogaj, S. "Managing Crowdsourced Software Testing—A Case Study Based Insight on the Challenges of a Crowdsourcing Intermediary", Journal of Business Economics (JBE) (DOI: 10.1007/s11573-014-0721-9), Feb. 20, 2014, Berlin, Germany.

Bugcrowd, "Fully Managed Bug Bounties", https://web.archive.org/web/20140125092649/https://bugcrowd.com, Dec. 31, 2012, San Francisco, CA, USA.

Finifter, Matthew, "An Empirical Study of Vulnerability Rewards Programs", 22nd USENIX Security Symposium, Aug. 14, 2013, Washington D.C., USA.

Howe, Jeff, "The Rise of Crowdsourcing", WIRED Magazine, Jun. 1, 2006, USA.

Kanich, Chris, "Putting Out a HIT: Crowdsourcing Malware Installs", University of California San Diego, San Diego, USA.

Ozment, Andy, "Bug Auctions: Vulnerability Markets Reconsidered", Workshop on Economics and Information Security, May 13, 2004, Minneapolis, MN, USA.

Ransbotham, Sam, "Are Markets For Vulnerabilities Effective?", MIS Quarterly, Jan. 1, 2012, vol. 35, No. X, USA.

Schechter, Stuart, "How to buy better testing", Harvard University, Boston, MA, USA.

Tippingpoint, "Why Did We Create the Zero Day Initiative?", https://web.archive.org/web/20130423130619/http://zerodayinitiative.com/about/, Apr. 23, 2013, USA.

Verma, Rohit, "Security Services using Crowdsourcing", 5th International Conference on Ambient Systems, Networks and Technologies (ANT-2014), Procedia Computer Science, Jun. 5, 2014, India.

* cited by examiner

INTERMEDIATED COMMUNICATION IN A CROWDSOURCED ENVIRONMENT

FIELD OF THE INVENTION

This invention is related to issues reporting in a crowdsourced environment by utilizing an intermediated communication protocol between various parties.

BACKGROUND ART

In today's complex technological world, a great deal of attention is paid to remediating security vulnerabilities of information technology (IT) products. A key concern about IT systems in today's interconnected world is the exploitation of vulnerabilities and bugs in these systems by hackers. Hackers and other adversaries may be internal or foreign, who are searching for vulnerabilities and misconfigurations in an organization's IT infrastructure with the purpose of exploiting them, often with severe consequences to the organization.

The detection of such IT vulnerabilities and IT security in general, therefore remains an area of active interest among government agencies, and private sector entities, both large and small, private or public. A lot of attention and focus has been devoted by many organizations and academic institutions in developing platforms, tools and ideas that can detect such vulnerabilities and misconfigurations in an organization's IT infrastructure. A timely detection of the vulnerabilities/bugs in an IT infrastructure is essential for their proper and timely remedy/fix. As a consequence of timely fixes of these vulnerabilities, their exploitation by adversaries can be prevented. Otherwise, such exploitation can have catastrophic consequences for the respective businesses, organizations and/or their customers/partners.

Using a crowdsourced platform for reporting such vulnerabilities has received much interest of late. Existing teachings in the prior art in this regard include U.S. Pat. No. 9,413,780 B1 to Kaplan et al. This patent reference teaches a method for inviting a distributed plurality of researchers to participate in one or more computer vulnerability research projects. The projects are directed to identifying computer vulnerabilities of one or more networks that are owned or operated by a third-party and to assessing reputation and skills of one or more of the researchers. The method involves accepting a subset of the researchers who have a positive reputation and sufficient skills to perform the investigations of the computer vulnerabilities. The method further assigns a particular computer vulnerability research project, relating to a particular network under test, to a particular researcher from among the subset of the researchers. It provides for monitoring communications between the particular researcher and the particular network under test.

The method then provides for awarding the particular researcher in response to successfully validating a report of a candidate security vulnerability of the particular network under test.

U.S. Patent Publication No. 2015/0254596 A1 to Nayar et al. discloses techniques for distributing tasks to skilled workers participating in a managed crowd-sourcing workforce. A crowd worker routing system receives a request for a task assignment from a first worker participating in the crowd-sourcing workforce. The crowd worker routing system retrieves one or more scores associated with the first worker, such that each score is related to the performance of the first worker with respect to completing a prior set of task assignments. The crowd worker routing system determines that a first task assignment included in a first set of task assignments is related to a first score included in the one or more scores. The crowd worker routing system then determines whether to route the first task assignment to the first worker for completion based on the first score and one or more routing rules.

Further, some Non-patent literature (NPL) references attempt to disclose polices for coordination between the various parties for the disclosure of security vulnerabilities. These are "Handling Mozilla Security Bugs" by Mozilla dated 2016, "Full Disclosure Policy (RFPolicy) v2.0" at http://www.wiretrip.net/rfp/policy.html, dated 2016, "Responsible Vulnerability Disclosure Process" by Internet Engineering Task Force, 2016, "Coordinated Vulnerability Disclosure" by TechNet dated 2016 and "Information technology—Security techniques—Vulnerability disclosure" by International Standards Organization (ISO) dated 2014.

However, a key shortcoming of the prior art teachings is that they fail to teach a robust communication framework or protocol between the customers and the researchers of a crowdsourced platform. Such a framework absent from the prior art should clearly set response-time expectations between the researchers and customers, that are governed by the use of a timer. Prior art is thus silent about a policy or service level agreement (SLA) based communication protocol between customers/subscribers of the crowdsourced platform and the researchers or experts. Such a platform absent from the prevailing art could be effectively used to test a variety of different systems for a variety of different purposes, including detecting security vulnerabilities.

OBJECTS OF THE INVENTION

In view of the shortcomings of the prior art, it is an object of the present invention to provide a system and methods for a robust communication and expectations setting framework between the crowdsourced parties.

It is another object of the invention to provide the above framework by the use of a timer.

It is another object of the invention to allow for various types of testings of various types of systems, programs or products using a crowdsourced platform in a frustration-free manner.

It is still another object of the invention to improve internet of things (IOT) or other types of smart devices by leveraging the crowdsourced platform.

Still other objects and advantages of the invention will become apparent upon reading the detailed description in conjunction with the drawing figures.

SUMMARY OF THE INVENTION

The objects and advantages of the invention are secured by a system and methods for improving communication and expectation setting between customers and researchers of a crowdsourcing/crowdsourced issues reporting platform. The platform leverages the power of the crowd or the community of the researchers to test and improve a target system or program or product or simply a target. A target may be any type of system or device, including an internet of things (IOT) device that needs be tested by one or more from the community of researchers. The testing may be a security vulnerabilities testing, a usability testing, a quality assurance (QA) testing or bug finding, a customer service testing or any other type of testing that leverages the power of the crowd or researcher community to improve the target system/program/product.

The testing is accomplished by running a bounty program through the crowdsourcing platform. To run a bounty program, a customer first enters or inputs a target brief into the system. The target brief contains all the necessary information for the researchers to acquire and/or set up and/or access one or more targets that require testing and improvement. This information includes any required access uniform resource locator (URL's) for the target(s), instructions for performing the testing, what is in and out of scope, the amount of payout or reward or the bounty of the bounty program, response-time timer length or service level agreement (SLA), etc.

In response to the entry of a target brief by the customer, one or more researchers enters or inputs a submission about an issue that the researcher has uncovered/discovered in the target. A submission contains all the necessary information about the issue, its severity level or status, and the steps required to reproduce the issue. One or more supervisors of the platform or the "third-party" then reviews or examines the submission for its completeness or validity. This examination is referred to as a third-party examination. In alternative variations, the third-party examination may be a partially automated or fully automated process using machine learning and/or other techniques available in the art. If the submission appears valid and ready to be presented to the customer, the customer is alerted accordingly and a response-time or SLA timer is started.

The customer then reviews or examines the submission by what is referred to as a customer examination. If the customer agrees with the content of the submission, it is marked as completed or confirmed. Next, the researcher is paid the agreed upon bounty amount for discovering the issue. If the submission is determined to be incomplete either as a result of the third-party examination or the customer examination explained above, more information is requested of the above specific researcher and the timer is restarted. As a consequence of this request for more information, the researcher re-enters or updates the submission in the platform and the above process is repeated.

If the customer disagrees with the submission, it is marked as disputed, the timer is paused and the third-party intervenes or mediates to resolve the dispute. Dispute resolution may be a fully manual, partially or fully automated process. The timer is restarted once the dispute is resolved. If at any time during the above process, the timer expires, then the platform informs the customer and the researcher accordingly and the submission is closed. The above timer based or response-time or SLA based communication between the researchers and the customers provides for a much more robust and frustration-free communication environment than the techniques available in the prior art. Such an environment provides for proper setting of expectations between the two parties that results in better or more productive bounty programs and ultimately better target systems, programs or products.

In order for the above parties to perform their above-explained functions, appropriate user interface (UI) is provided. The UI may take the form of one or more screens. The screens may be textual or graphical user interface (GUI) screens. As noted above, the present methods and systems result in a more improved target than otherwise possible. An improved target or target system/program/product may be a more secure target after the customer has remediated the security issues or vulnerabilities discovered in the crowdsourced testing, and/or it may be a more user-friendly target after the customer has remediated the usability issues discovered in the crowdsourced testing, and/or it may be a more stable target after the customer has remediated the bugs or QA issues discovered in the crowdsourced testing, and/or it may a more improved target because of a better customer service associated with it, etc.

In some embodiments, the target is an IOT device, such as a smart-thermostat, or a smart-fridge/refrigerator or any other smart-home or smart-car device. In such a scenario, the above target brief contains all the necessary instructions for the researcher to acquire or access the device and to conduct the requisite testing.

The above community of customer and researcher users are initially onboarded onto the platform. The onboarding may require any necessary vetting to validate the users. Once a researcher is vetted or validated he or she is provided appropriate login credentials and relevant screens to perform the above testing of the bounty program. In a similar fashion, a customer may also be validated for onboarding, although this validation may be different from a researcher validation. As already mentioned, parts or the whole of the instant crowdsourced/crowdsourcing issues reporting platform may be automated. Such an automation may utilize techniques known in the art, such as supervised and/or unsupervised machine learning (ML). The platform can be hosted on-site at a suitable location of the third-party such as a data center or in a cloud. The cloud hosting the platform may be public, private or semi-private based on techniques known in the art.

Clearly, the system and methods of the invention find many advantageous embodiments. The details of the invention, including its preferred embodiments, are presented in the below detailed description with reference to the appended drawing figures.

BRIEF DESCRIPTION OF THE DRAWING FIGURES

DETAILED DESCRIPTION

The figures and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures. It is noted that wherever practicable, similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

Figure 1:
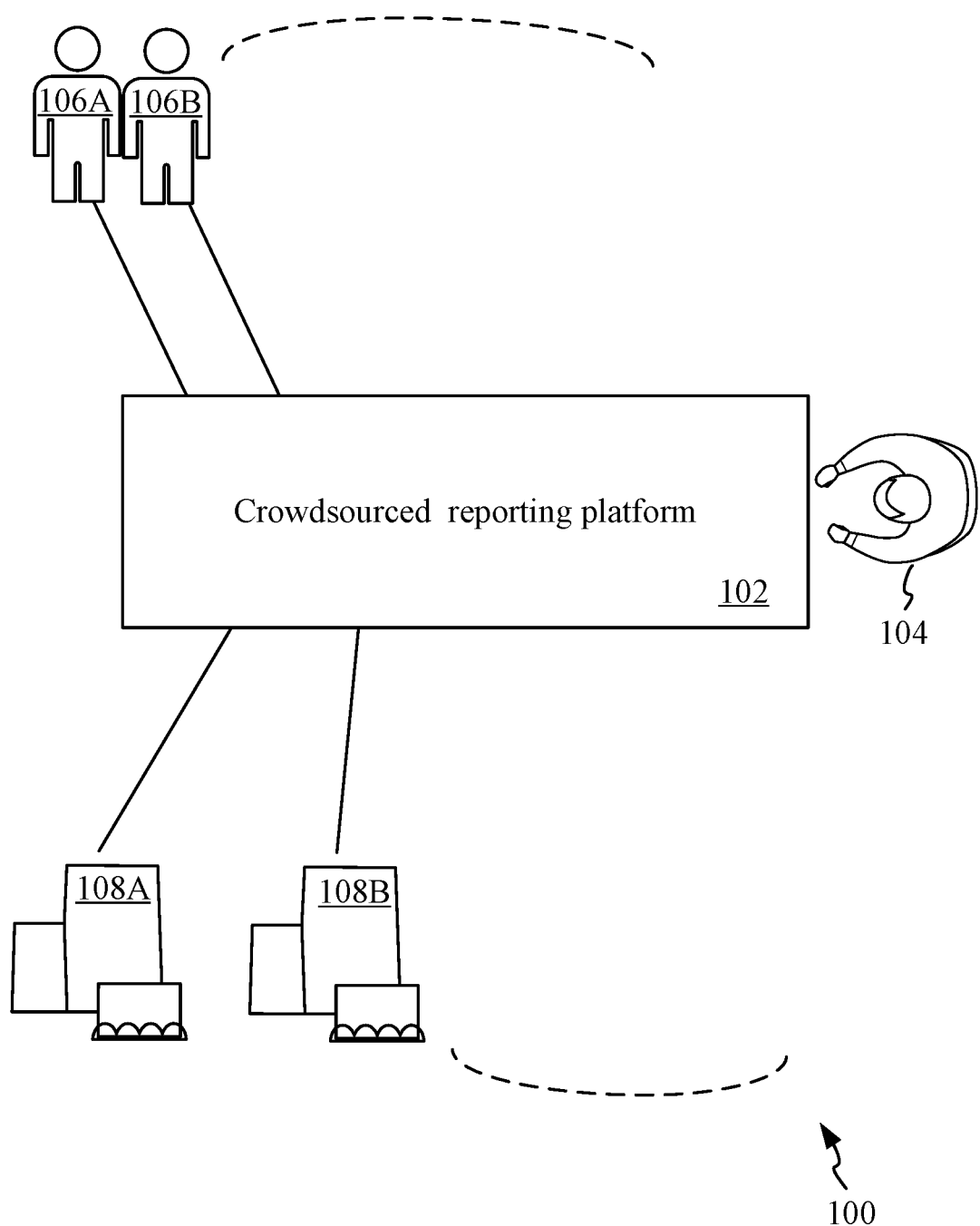
FIG. 1 is a high-level overview of a crowdsourced issues reporting system according to the present invention.

The methods and systems of intermediated communication in a crowdsourced environment of the present invention will be best understood by first reviewing a crowdsourced issues reporting system 100 as illustrated in FIG. 1. As will be explained that in the context of the present disclosure, issues may be any type of issues about a target system or program or product uncovered by the help of the crowd. These include any type of technical or business issues such as software/hardware/firmware vulnerabilities, usability/user-interface issues or feedback, general or specific quality assurance (QA) testing, bug finding, customer service issues, logistical issues, etc. Timely remediation of such issues by the customer results in a much more improved target system/program/target than would be otherwise possible.

Crowdsourced issues reporting system 100 of the present invention provides the necessary infrastructure to operate bounty programs for the identification of above issues in a crowdsourced fashion. System 100 contains a central issues reporting platform 102, which operates under a crowdsourcing model and provides a robust communication framework or protocol between the various parties so that there is a clear setting of expectations and minimum frustrations between the community members. System 100 further comprises a supervisor 104. Any number of such supervisors may be present in system 100, but only one such supervisor is shown for clarity in FIG. 1. Typically, supervisor 104 would belong to the same organization as the one owning and operating platform 102, also referred to as the "third-party".

Crowdsourced reporting system 100 further comprises a number of customers or subscribers 108A, 108B, . . . . Any number of such customers/subscribers may be configured or onboarded onto platform 102. Customers 108A, 108B, . . . may be entities of any type. Specifically, they may be individuals, or organizations, public or private, government agencies, etc. Subscribers or customers or clients 108A, 108B, . . . are the entities in system 100 that want to have their target programs or systems or products analyzed by a set of experts or researches. These may comprise hardware, software, firmware programs, devices or a combination thereof. For the purposes of this disclosure, we will refer to any of the above systems/program/products, whether it is hardware, software, firmware or a combination, by simply the term "target".

The objective of these customer/client entities is the detection and reporting of issues or feedback about their targets. As already noted, the issues may be of any type, and whose remediation by the customer/client will generally result in the improvement of their targets. Leveraging the power of a community/crowd, these entities can thus gather knowledge of flaws or feedback about their systems more efficiently, economically and reliably than relying merely on their internal IT resources. They can then correct these flaws or take other remedial actions about vulnerabilities in a timely fashion and avoid potentially catastrophic consequences. Similarly, they can make their product more user-friendly by remediating or acting upon the usability issues discovered by the crowd. In general, they can improve their product and business by gathering valuable knowledge obtained in a crowdsourced or a bounty program manner.

Thus, crowdsourced issues reporting system 100 also has one or more of experts or researchers or researcher experts 106A, 106B, . . . configured into issues reporting platform 102. Depending on the type of issues to be uncovered about a target program/system/product or simply target, a researcher may be a security expert, a usability expert, a power user of a product, a QA expert, a customer service expert, a logistics expert, or any type of expert suited to discover issues about a certain target for its improvement.

Any number of such researchers 106A, 106B, . . . in a community or crowd may be onboarded or configured onto platform 102. Researchers 106A, 106B, . . . operate in a crowdsourcing model as will be explained below. These researchers are responsible for detecting flaws in the targets belonging to companies or customers 108A, 108B, . . . and reporting these flaws to the respective customers by utilizing issues reporting platform 102 as will be further explained below. As already mentioned, there may be more than one supervisor 104 configured into platform 102. These supervisors may be assigned to specific companies 108A, 108B, . . . and/or researchers 106A, 106B, . . . . Platform 102 may be hosted for the crowd in a private, public or semi-private hosted environment or cloud.

Figure 2:
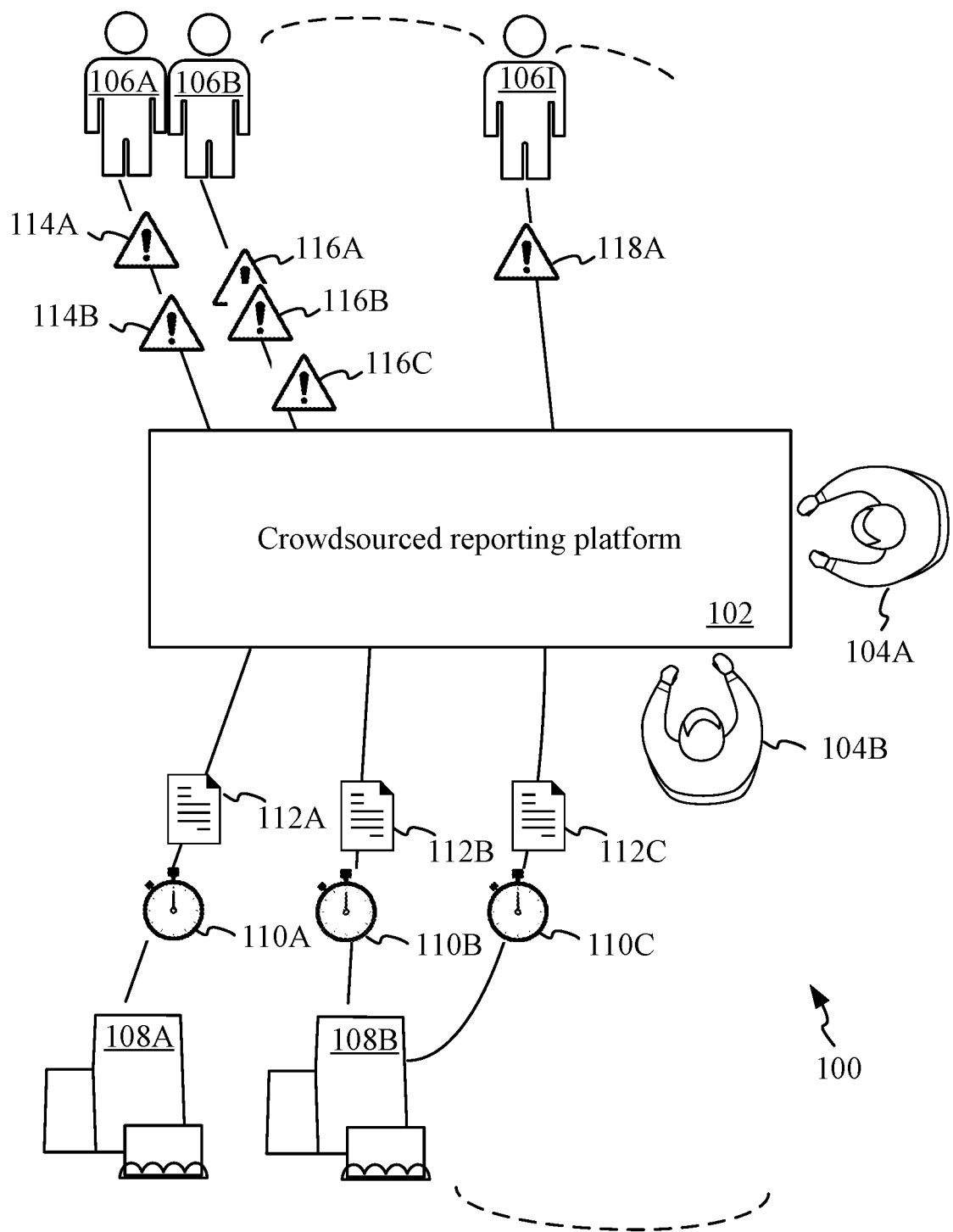
FIG. 2 is a more detailed version of the diagram of FIG. 1 showing target briefs and submissions being entered/inputted by customers and researchers respectively into the platform.

To better understand the operation of system 100 of FIG. 1, let us turn our attention to FIG. 2. FIG. 2 shows a more detailed block diagram representation of the crowdsourced reporting system 100 of FIG. 1. FIG. 2 shows that a customer or subscriber 108A provides/enters a target brief 112A about a target that it wants to be tested or analyzed by the crowd on platform 102. A target brief is a document describing the details of the target that the customer wants to have tested/analyzed for the detection of security or other issues.

Similarly, customer/subscriber 108B provides/enters a brief 112B about the target that customer 108B wants to have tested. It should be noted that any number of such target briefs may be entered by customers of platform 102. In other words, subscriber 108A or 108B may have multiple target briefs entered into platform 102 at a given time. Indeed, FIG. 2 shows a target brief 112C also entered by customer 108B. Alternatively, a customer of platform 102 may not have any target brief entered into platform 102 at a given point in time.

In addition to target brief 112A, customer 108A also has a timer length 110A associated with target brief 112A and entered into platform 102. Similarly, customer 108B has timer lengths 110B and 110C associated with target briefs 112B and 112C respectively entered into issues reporting platform 102. A timer length represents the length of time that a customer or researcher is allowed to utilize before its response is due in platform 102. It should be noted that there is one timer length specified for each target brief entered by customers 108A, 108B, . . . in platform 102. The use of a timer as will be explained below, in a intermediated/mediated multiparty communication allows for a much better experience between the various parties and is a key innovative aspect of the present design.

FIG. 2 further shows researcher experts 106A, 106B, . . . from FIG. 1 configured into platform 102. One specific researcher from amongst a crowd of such researchers is shown as 106I. A researcher can submit one or more submissions in response to target briefs 112A, 112B, 112C, . . . entered into platform 102 by subscribers/customers 108A, 108B, . . . . These submissions are shown with reference numerals 114A, 114B entered by researcher 106A, submissions 116A, 116B, 116C entered by researcher 106B and submission 118A entered by researcher 106I.

Note that the actual testing of the targets in which issues are discovered by researchers 106A, 106B, . . . is carried on the specific hardware/software/firmware environment specific to each target 112A, 112B, 112C, . . . . The technical stack and other system requirements for the testing of a target are specified by the customer/subscriber in the respective target brief. Typically, for targets that are web based programs/applications, researchers or testers would test these over the internet via their uniform resource locators (URL's) specified in the target brief(s). The testing may require them to use various types of web browsers typically without the need of a specialized technical stack to be installed locally at the researchers' end. Exemplary web browsers using which researchers would test include Microsoft Internet Explorer or Edge, Mozilla Firefox, Google Chrome, Apple Safari, etc. Alternatively, they may be required to install a software stack locally, or to even acquire a system or device for testing.

In general, a submission, such as submissions 114A-B, 116A-C and 118A of FIG. 2, contains the details of an issue discovered by the researcher about a target. These details may include a detailed description of the issue, as applicable, any specialized environment or technical stack that the researcher used to uncover the issue, the several level/status of the issue and the steps required to reproduce it. For example, submission 116B entered by researcher 106B may be about an issue discovered in the target with target brief 112A, while submission 116C may be about a target with target brief 112C. Although not impossible, it is unlikely that a submission will apply to more than one targets in platform 102.

In related variations, researchers 106A, 106B, . . . are segmented or partitioned based on customers 108A, 108B, . . . and/or based on the bounty programs associated with target briefs 112A, 112B, 112C, . . . such that only the researchers matching a particular customer or a bounty program participate in that bounty program.

Thus, it is possible that researchers 106A and 106B are both testing programs 112A and 112B, while researcher 106I is testing only target 112C. Such matching may be based on the skillset and experience of the researcher and the technical requirements of the bounty programs as specified in the target briefs.

In a similar manner, supervisors 104A and 104B may supervise all the customers and their bounty programs and the researchers on platform 102 or they may be assigned to a certain segment of customers/subscribers and/or their bounty programs and/or researchers. Thus, in one exemplary configuration, supervisor 104A supervises the bounty program associated with target brief 112A and all submissions related to that program, while supervisor 104B supervises those related to target brief 112B and 112C. Such a segmentation of supervisors 104A-B may again be useful because the background skills and domain expertise of supervisors 104A-B may match certain types of programs better than others.

The above segmentation may also be useful because certain supervisor(s) may have better relationship with some customers and/or better historical knowledge of some targets than others. Note that it is also possible that more than one supervisors may be assigned to a program. This may be the case if a lot of submissions are anticipated for that bounty program. Alternatively, no human supervisors may be assigned to a program because in such a variation, platform 102 may handle all aspects of the operation without the human involvement of the supervisor and be fully automated. The above matching/segmentation/partitioning on platform 102 of researchers 106A, 106B, . . . and/or supervisors 104A-B to the bounty programs or targets identified in briefs 114A-B, 116A-C and 118C may be done manually. This could be done by supervisors 104A, 104B themselves or still other users/administrators (not shown) of platform 102. Alternatively, the above matching/segmentation may be partially or fully automated utilizing techniques known in the art. Such techniques may employ machine learning that may supervised and/or unsupervised.

In a similar manner, the initial onboarding of researchers 106A, 106B, . . . and/or customers 108A, 108B, . . . may require any necessary vetting to validate the researchers and/or the customers. Specifically, a researcher may be vetted for his technical expertise and prior experience so he/she can be a bona fide member of the researcher community. Once a researcher is vetted or validated he or she is provided appropriate login credentials and relevant screens to perform testing of a given bounty program or programs. In a similar fashion, a customer may also be vetted/validated for onboarding, although this validation may be different from a researcher validation. Again, in highly useful and alternate variations, the above vetting may be partially or fully automated utilizing techniques known in the art. Such techniques may employ supervised and/or unsupervised machine learning.

Figure 3:
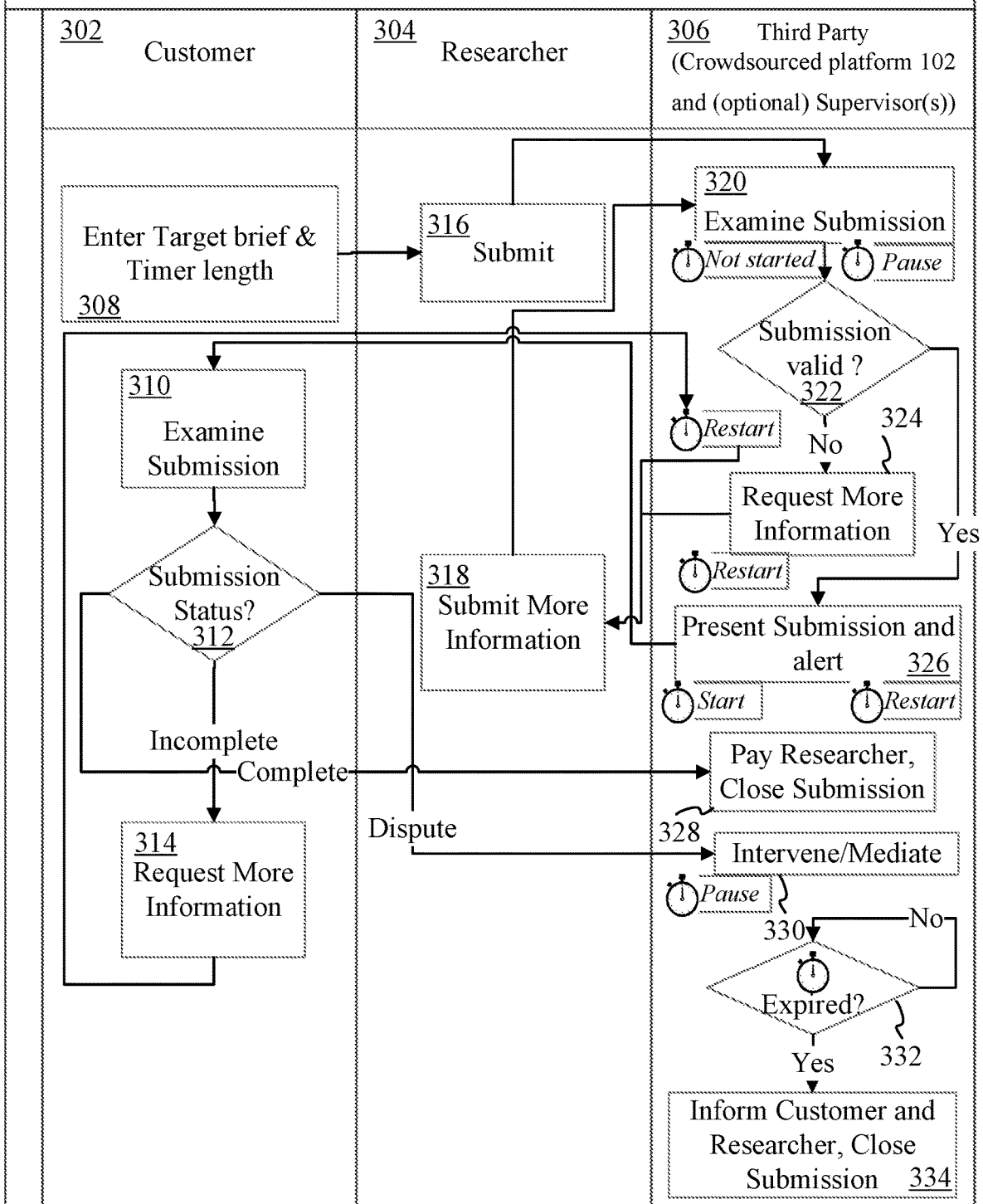
FIG. 3 is a cross-functional flowchart with swim lanes showing the functions performed by the various parties in a crowdsourced environment of the instant teachings.

FIG. 3 shows in a cross-functional flowchart 300, with the aid of swim lanes, the interactions between the various parties involved in the operation of crowdsourced issues reporting system 100 of FIG. 1 and FIG. 2. Specifically, the three swim lanes belong to a customer/subscriber 302, a researcher 304 and a third-party 306 who is in charge of crowdsourced issues reporting platform 102 of FIG. 1-2 as noted above. Third-party is generally responsible for operating platform 102 in a hosted environment which may be a private, public, or semi-private cloud based utilizing techniques known in the art. It is this third-party 306 that supervisor 104 of FIG. 1 and supervisors 104A-B of FIG. 2 belong to. Recall that having supervisors operating on platform 102 is optional, and their functions can be partially or fully automated using techniques known in the art.

The skilled reader will observe that third-party 306 in FIG. 3 can be further broken down into platform 102 and its human supervisors (if any). However, in order to not detract from the key principles of being taught, FIG. 3 shows only one swim lane for third-party 306. It should be understood, that the functions specified in the swim lane of the third-party may be carried out autonomously by platform 102 of FIG. 1-2 without human intervention, or they may be fully carried out by human supervisors, or a combination of the above.

Let us now take a closer look at the various functions for the three parties of the three swim lanes in the flow diagram of FIG. 3. Unless otherwise stated, in the below explanation of the embodiments explained in reference to FIG. 3, customer 302 may be our customer 108B of FIG. 2. In a similar manner, the target brief may be target brief 112C, the timer length may be timer length 110C, researcher 304 may be researcher 106I amongst a community/crowd 106A, 106B, . . . of researchers, the submission may be submission 118A and the optional supervisor may be supervisor 104B, all from FIG. 2 as discussed above.

Furthermore, when referring to the functions performed by the supervisors of third-party 306, it is understood that such tasks can alternatively be fully automated into platform 102 so no or minimal human intervention of the supervisors is needed. Such automation may employ supervised and/or unsupervised machine learning and/or other learning/automation techniques known in the art. Thus, in the below explanation we will simply state that these functions are being performed by third-party 306 with the knowledge that they in turn may be performed by its supervisors of platform 102 or be partially or completely automated.

Now customer/subscriber 302 initiates its activities by first entering a target brief for the target to be tested. The target brief contains information that enables the researchers to access a target, for example, the URL to a staging or beta website of a target web application or to a production website. Alternatively, instructions may be provided about how to download a software stack to run or access the target program. Alternatively still, instructions may be provided about how to obtain access to and set up a hardware/firmware system or a device or a product, such as a smartphone or a tablet, or a smartwatch. Alternatively still, instructions may be provided about how to obtain, acquire or procure, and set up or access any Internet of Things (IOT) device or product, such as a smart-home or smart-car product. This includes a smart-thermostat, a smart-fridge, a smart-microwave, a smart music-player, etc.

Thusly, target program/system/product may be any software-only, hybrid or firmware-only/hardware-only/physical apparatus/device and the target brief provides instructions to the researchers on how to obtain and setup or to access such a program/system/product for testing purposes.

As will be explained, the target brief may also contain the timer length signifying the service level agreement (SLA) response-time that will be expected of the researchers and of the customer. Similarly, these may also contain the payout amounts that the researchers can expect to get for a successful or confirmed submission. Alternatively, the timer length and/or SLA response-time may also be preset to standardized or default values in platform 102 for a variety of different targets and bounty programs. In such a scenario these values may not necessarily need to be also communicated in a given target brief.

The provision of the timer length and SLA's according to the present techniques clearly sets the response-time expectations between the customer and researcher communities and provides for a much more reliable and robust communication framework than the teachings of the prior art. As provided herein, the framework is driven by agreed-upon policies and SLA's between the researchers and customers that results in a more stable and smooth operation of the crowdsourced system than otherwise possible.

An exemplary target brief entered by customer 302 from a bug bounty program as supported by platform 102 is provided below.

Targets
1. https://url.of.the.target.system-1
2. https://url.of.the.target.system-2
3. https://url.of.the.target.system-3
Please note that the scope is subject to change
Response-time SLA (customer < > researcher): 48 hours
Credentials
Users can create their own accounts at will, and will default to the free plan
Focus Areas
The boards and prototypes section have been heavily tested, so we would like to focus on the more obscure parts of the application
Out-of-Scope
   0-day vulnerabilities that are less than 30 days old
   Any subdomain listed below (subject to change):
      support.url.of.the.target.system
      blog.url.of.the.target.system
      url.of.the.target.system
NOTE: Network Level distributed denial of service (DDoS) and any denial of service (DoS) attacks are forbidden. Application and Volumetric DDoS/DoS attacks are forbidden. If you find a request that takes too long to answer report it, please do not try to DoS the service.
The following finding types are specifically excluded from the bounty:
General
   Insecure direct object references (IDOR) references for objects that you have permission to
   Duplicate submissions that are being remediated
   Multiple reports for the same vulnerability type with minor differences (only one will be rewarded)
   Rate limiting
   LiveShare termination
   Lack of Security Speedbump when leaving the site
   Open redirect
   Clickjacking and issues only exploitable through clickjacking
   File uploads
System related
   Patches released within the last 30 days
   Issues or industry standards outside of our control
   Password complexity
Email related
   Sender policy framework (SPF) or domain-based message authentication reporting and conformance (DMARC) records
   Gmail "+" and "." acceptance
   Email bombs
   Unsubscribing from marketing emails
Information leakage
   Descriptive error messages (e.g. Stack Traces, application or server errors)
   HTTP 404 codes/pages or other HTTP non-200 codes/pages
   Fingerprinting/banner disclosure on common/public services
   Disclosure of known public files or directories, (e.g. robots.txt)
   Cacheable SSL pages
CSRF
   Cross-site request forgery (CSRF) on forms that are available to anonymous users (e.g. the contact form, sign-up form)
   Logout Cross-Site Request Forgery (logout CSRF)
   Weak CSRF in the APIs
Login/session related
   Forgot Password page brute force and account lockout not enforced
   Lack of Captcha
   Sessions not expiring after email change
   Presence of application or web browser 'autocomplete' or 'save password' functionality
   Session Timeout (this is available in our Enterprise product, which we are working to get a testing environment setup for testing)
Missing HTTP security headers or flags, specifically (https://www.owasp.org/index.php/List_of_useful_HTTP_headers), e.g.
   Strict-Transport-Security
   X-Frame-Options
   X-XSS-Protection
   X-Content-Type-Options
   Content-Security-Policy, X-Content-Security-Policy, X-WebKit-CSP
   Content-Security-Policy-Report-Only
   Secure/HTTPOnly flags on non-sensitive cookies
   Options flag is enabled SSL Issues, e.g.
  SSL Attacks such as BEAST, BREACH, Renegotiation attack
  SSL Forward secrecy not enabled
  SSL weak/insecure cipher suites
Other rules
This program follows standard disclosure terms (click to open).
This program does not offer financial or point-based rewards for Informational (P5) findings.
This bounty requires explicit permission to disclose the results of a submission.

Note that a given bounty program may cover several targets as provided in the above exemplary target brief. Additionally, each target may require testing for a specific environment or operating system (such as MS Windows, Linux, MacOS, Android, iOS, etc.) or its own specific "stack".

Now, returning back to FIG. 3, along with the target brief, customer 302 also enters a timer length or SLA response-time per above explanation into platform 102. The entry or inputting of the target brief and timer length is depicted by function or box 308 in FIG. 3. Now, let us assume that the timer is set to a length of 48-hour duration. That means, that each of customer 302 and researcher 304 will be beholden to a service level agreement (SLA) of 48-hour response time. In other words, both of the above two parties (customer 302 and researcher 304) must respond within 24 hours of when a response becomes due of that party.

In response to target entry/input box 308, researcher 304 enters or inputs a submission as denoted by box 316. In response to submission entry/input 316 third-party 306 examines the submission to determine if it is valid and ready to be presented to customer 302. In order to distinguish this examination from the examination of the submission conducted by customer 302, or customer examination further down the flow and to be discussed later, we will refer to it as third-party examination. During the time third-party 302 conducts its third-party examination of the submission, the timer is not started, or is paused if it is a subsequent examination of the submission following box 318 per below explanation.

The third-party examination is shown by box 320 and the check is indicated by decision diamond 322. The above examination will include verifying the validity of the data in the submission by third-party 306, such as ensuring that the submission properly belongs to the right bounty program, contains the required essential data for a valid submission as required for the bounty program and follows the standard rules of engagement as prescribed by platform 102. The above examination may be partially or fully automated using supervised and/or unsupervised machine learning and/or other methods available in the art.

Now, if the submission is found to be valid at decision diamond 322, then third-party 306 presents this submission to customer 302 as shown by box 326 and starts the timer (or restarts the timer for a subsequent iteration per below explanation). The submission is presented by first alerting the customer using one or more of a variety of communication methods, such as email, Rich Site Summary (RSS) feed, Slack, social medial, etc.

In turn, customer 302 examines the submission per box 310 to check its status as shown by decision diamond 312. As noted above, this examination is referred to as the customer examination of the submission to distinguish it from third-party examination of the submission performed/conducted at box 320 by third-party 306. If the customer agrees with the submission then marks it as complete/confirmed or assigns it a complete/confirmed status. In this case, third-party 306 pays researcher 304 the agreed upon payout amount as shown by box 328 and closes the submission, or changes the status of the submission to closed. The above flow represents the "sunny day" scenario in the cross-functional flowchart 300 of FIG. 3. Now, let us see what happens in alternative scenarios.

First of all, at any stage in the above sunny day scenario, if the timer expires, third-party 306 informs both customer 302 and researcher 304 and closes the submission. Obviously, timer expiration is signified by the timer running past the specified timer length entered by the customer. This continual check of the timer by third-party 306 is shown by decision diamond 332, and the function of informing the customer and the researcher is shown by box 334. Again, a variety of methods may be used to inform the above parties, such as such as email, RSS feed, Slack, social medial, etc.

Now referring back to the flow at decision diamond 322, if third-party 306 determines that the submission is not valid and ready to be presented to customer 302, then it requests more information from researcher 304 and resets/restarts the timer as shown by box 324. In response to this request for more information, researcher 304 submits additional information about the submission as shown by box 318. This takes the flow back to third-party examination box 320 and the flow continues per above explanation. Again, if at any juncture the timer expires, both the parties are notified and the submission is closed, as per decision diamond 332 and box 334.

Referring to the flow at decision diamond 312, if customer 302 determines the submission to be incomplete, it also requests more information as per box 314 from researcher 304 thereby restarting the timer, which takes the flow back to box 318 and the rest of the flow continues as explained. If however, customer 302 does not agree with the submission, then the customer can mark the submission as disputed. Specifically, the customer can mark the submission as disputed in one or more of the following scenarios:

Customer does not agree with the technical severity of the issue reported in the submission.
The submission is a duplicate of a previous submission.
The customer already knows about the issue from another source.
The issue discovered is a systemic issue, such as a flaw in the standards or protocols.
Customer cannot reproduce the issue based on the steps provided in the submission.

At this stage the timer is paused, and third-party 306 intervenes or mediates to resolve the dispute as indicated by box 330. Once again, if at any point the timer expires, both the parties are notified and the submission is closed, as per decision diamond 332 and box 334.

Dispute resolution may be a manual or partially/fully automated process. For resolving a dispute, third-party 306 "follows up" with the customer and the researcher. The follow up will involve a dialogue with the above parties using one or more of variety of communication facilities, such as email, RSS, Slack, social medial, etc. Although for some embodiments, such a follow up will be a manual process, it is readily conceived that for known disputes arising in platform 102 for familiar bounty programs, dispute resolution and related follow up may be fully automated using techniques known in the art—including scripting and machine learning (supervised or unsupervised).

The above follow up will be based on third-party 306 reviewing the submission's status independently to ascertain whether its status is correct or not. For example, if the supervisor(s) of third-party 306 can reproduce the issue based on the details provided in the submission, they can then mark the submission as confirmed and reconcile with customer 302 and resume the timer. If not, they can then mark the submission as incomplete and follow up with researcher 304 about their findings and resume the timer.

The researcher may then work separately with third-party 306 until both can agree on the status of the submission and then follow up with the customer. In the event, no agreement can be reached with the researcher or a predetermined number of attempts to do so have been made, the submission can be marked closed without payment to the researcher.

The interaction of various parties (customer 302, researcher 304 and third-party 306) with crowdsourced platform 102 occurs via a user interface (UI). The UI may be textual, or graphical. The UI may further have a number of user interface screens. The user interface screens may be graphical user interface (GUI) screens although that is not necessarily a requirement.

Specifically, customers/subscribers or clients, such as customer 302 of FIG. 3, are provided their own customer login credentials to platform 102 by third-party 306 who owns and/or operates the platform. Using these credentials, customers/subscribers are able to log into the platform, and perform the activities outlined in FIG. 3. For example, one or more screens are provided to them on the platform to perform the functions of target entry/input box 308. As such, may be provided GUI screens to enter the target brief and the timer length or response-time SLA.

As already noted, in related variations, the timer configuration/length may be a standard or default value on platform 102 for a number of bounty programs being run and may not need to be necessarily entered/inputted at box 308. In still related variations, there may be default values of the timer length and the payout amounts configured on platform 102, that may be overridden by customer 302 for a specific bounty program being run.

Similarly, there may be one or more UI screens to review or examine the submissions entered by researcher at box 310. At this stage, there may some automation provided by platform 102 so that the examination process may be partially or fully automated. Such automation may be accomplished using machine learning tools known in the art. Then, the review UI screens would provide the user of customer 302 to mark the submission as confirmed or incomplete per above explanation. This may be accomplished using a drop-down menu selection of a GUI, as an example.

In a similar fashion, the researcher community of platform 102 of which researcher 304 of FIG. 3 is a member, is also provided its researcher login credentials and a set of screens to accomplish the functions outlined in FIG. 3. Specifically, there will be a set of UI screens to perform submission entry/input at box 316. Such a screen would have a cut-and-paste facility to allow the research to cut and paste code snippets from his own computer or system to the submission screen so the exact path or process or steps for the reproduction of the issue can be communicated to customer 302. A similar set of screens would allow him/her to enter more information about a prior submission according to the function of box 318 explained above.

Analogously, admin/supervisor login credentials and a set of UI screens are provided on platform 102 for the supervisor user(s) of third-party 306 on platform 102. These screens cover the functionality for third-party examination of a submission at box 320, marking a submission at box 324 to require more information from researcher 304, once a submission is ready, presenting or dispatching it to be reviewed by customer 302 at box 326. These screens also cover paying to researcher 304 using one of the various available payment mechanisms known in the art at box 328, resolving a dispute at box 330 as explained above and informing the parties at timer expiration per box 334.

Although not required, platform 102 automatically controls the timer (start/restart/pause/resume) as per the swim lane of the third-party of FIG. 3 and per above explanation. Alternatively, the timer may be started/restarted/paused/resumed manually by a UI button/control of the above supervisor screens.

Figure 4:
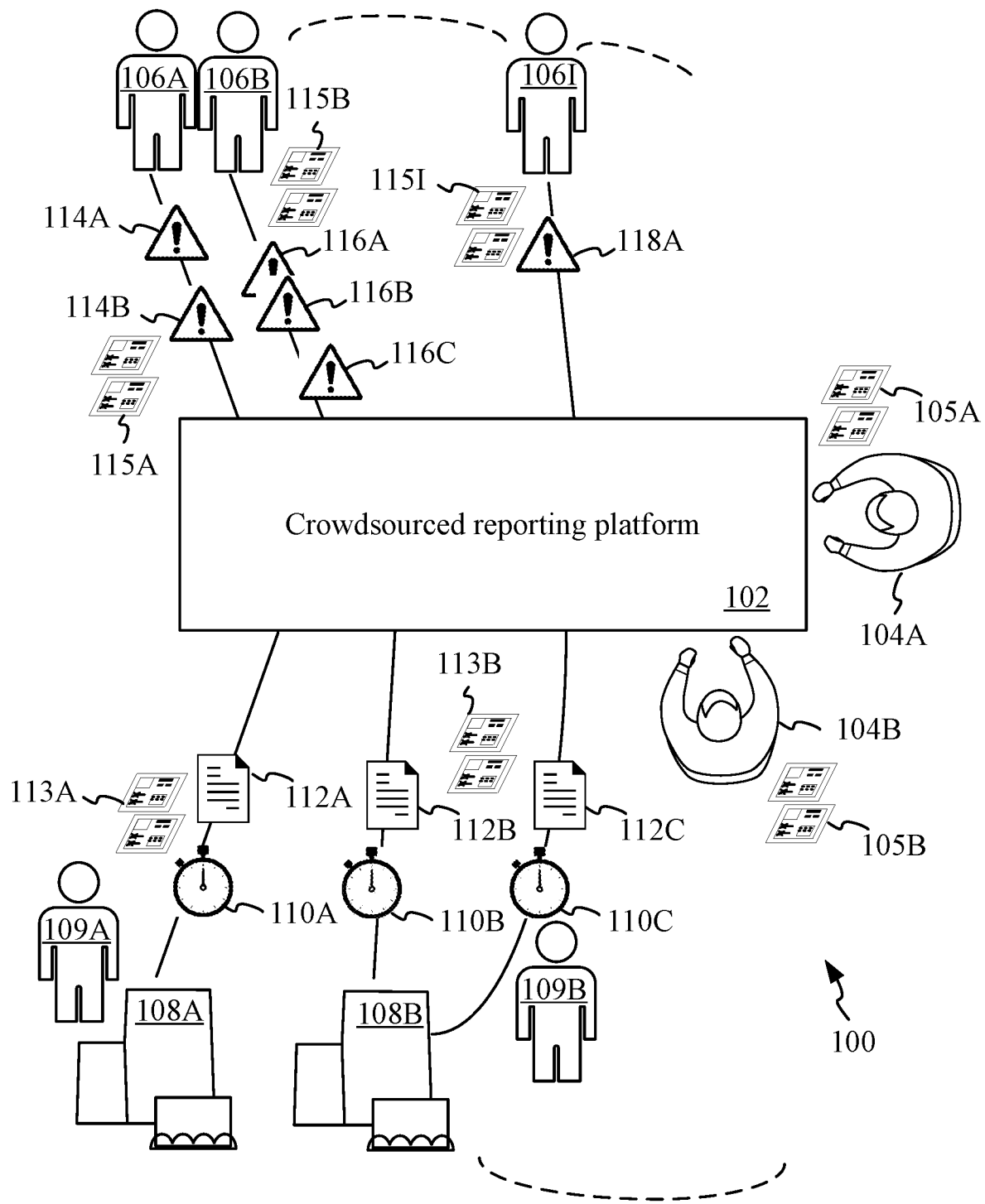
FIG. 4 illustrates how the various parties access the instant issued reporting platform via a user interface (UI) that may comprise of one or more screens, which may be GUI screens.

FIG. 4 is more detailed version of the drawing of FIG. 2, explicitly showing the various types of users of crowdsourced platform 102 and their UI screens for performing the above-mentioned tasks. Specifically, FIG. 4 shows researcher users or simply researchers 106A, 106B . . . 106I logged into platform 102 via screens 115A, 115B, . . . 115I respectively. FIG. 4 also shows a specific user 109A of our earlier customer/subscriber/client entity 108A using screens 113A to perform her functions on platform 102. Similarly, FIG. 4 also shows user 109B of customer 108B using screens 113B on platform 102. Finally, FIG. 4 also illustrates supervisors 104A using screens 105A and 104B using screens 105B on crowdsourced issues reporting platform 102 to perform their functions per above discussion.

As noted above, the instant teachings provide the methods and systems for intermediated or mediated communication between the customers and researchers in a crowdsourced environment. Specifically, the intermediation is provided by the third-party between the customers and researchers as per the above teachings and the discussion in reference to FIG. 3. Such an intermediated communication using timers/SLA's provide for a much more robust framework for communication and expectation setting than the techniques of the prior art. The present techniques avoid high degree of frustration and "dropping the ball" scenarios that are commonplace in the absence of a well-regulated and third-party mediated communication protocol enforced by a timer or response-time SLA according to the above teachings.

In view of the above teaching, a person skilled in the art will recognize that the apparatus and method of invention can be embodied in many different ways in addition to those described without departing from the principles of the invention. Therefore, the scope of the invention should be judged in view of the appended claims and their legal equivalents.

What is claimed is:

1. A computer-implemented method for improving a computer system, said method comprising the steps of:
   (a) installing by a researcher a specialized software stack locally, said specialized software stack required for testing said computer system;
   (b) inputting by a customer using one or more user interface (UI) screens, a target brief into an issues reporting platform, said target brief containing instructions for said researcher for accessing said computer system, wherein said researcher performs said accessing via login credentials on said computer system, wherein said researcher performs said testing using said specialized software stack, and wherein said researcher discovers a vulnerability that exposes said computer system to an attack;
   (c) inputting a submission by said researcher using one or more UI screens, into said issues reporting platform, said submission based on and containing steps required to reproduce said at least one issue associated with said computer system;

(d) performing a third-party examination by a supervisor to determine whether said submission is valid;

(e) responsive to determining said submission to be valid by said third-party examination performed by said supervisor, presenting said submission to said customer for a customer examination and starting a timer, said supervisor belonging to an entity distinct from said customer and said researcher, said supervisor automatically assigned to said customer by said issues reporting platform based on a matching of one or more skills of said supervisor to a bounty program run on said issues reporting platform, wherein said matching is performed by a first machine learning technique;

(f) performing said customer examination by said customer of said submission, wherein said customer examination determines that said submission is incomplete, and said customer requesting more information from said researcher based on said submission being incomplete;

(g) responsive to said customer determining said submission is incomplete, said customer marking a status of said submission as disputed based on said vulnerability not being reproducible by said customer by said steps provided in said submission, and automatically performing a dispute resolution by said issues reporting platform by a second machine learning technique and while pausing said timer;

(h) responsive to said timer expiring relative to a time length, informing said customer and said researcher and closing said submission; and (i) remediating said vulnerability in said computer system for preventing said attack, and thereby causing said improving of said computer system.

2. The method of claim 1, wherein said computer system is an internet of things (IOT) device.

3. The method of claim 2, wherein said IOT device is a smart-fridge.

4. The method of claim 1, where said timer length represents a response-time for a service level agreement (SLA) between said customer and said researcher.

5. The method of claim 1, wherein said issues reporting platform is hosted in one of a public, private and semi-private cloud.

6. The method of claim 1, utilizing one or both of supervised and unsupervised machine learning during said third-party examination.

7. The method of claim 1, wherein said issues reporting platform performs its functions in one of a partially automated and a fully automated manner.

8. A crowdsourced platform for improving a target computer system, said crowdsourced platform comprising at least one memory device storing computer-readable instructions, at least one microprocessor coupled to said at least one memory device for executing said instructions, said at least one microprocessor configured to:

(a) input by a customer using one or more user interface (UI) screens, a target brief and a timer length of a timer, said customer amongst a community of customers and said target brief containing instructions for a researcher amongst a community of researchers for accessing and testing a target computer system, wherein said researcher performs said accessing and said testing of said target computer system and discovers at least one issue associated with said target computer system, wherein said researcher performs said accessing via login credentials on said target computer system and wherein said researcher performs said testing using a specialized technical stack installed locally by said researcher, and wherein said at least one issue exposes said target computer system to an attack;

(b) input a submission by said researcher using one or more UI screens, said submission based on and containing steps required to reproduce said at least one issue associated with said target, wherein a supervisor of said crowdsourced platform performs a third-party examination of said submission to determine if said submission is valid and requests more information on behalf of said customer from said researcher if said submission is not valid;

(c) if said submission is determined to be valid by said third-party examination performed by said supervisor, start said timer when said submission is presented to said customer for a customer examination, wherein said supervisor belongs to a party distinct from said customer and said researcher, wherein said supervisor is automatically assigned to said customer by an issues reporting platform based on a matching of one or more skills of said supervisor to a bounty program run on said issues reporting platform, wherein said matching is performed by a first machine learning technique, and wherein if said submission is determined by said customer examination to be incomplete, said customer requests more information from said researcher, and if said submission is determined by said customer examination to be complete, said customer marks a status of said submission as complete and said crowdsourced platform pays said researcher provided said submission was not just an informational finding, wherein said customer marks said status of said submission as disputed if said customer does not agree with a technical severity of said at least one issue reported in said submission and performing a dispute resolution by a second machine learning technique while pausing said timer;

and (d) inform said customer and said researcher and close said submission if said timer expires relative to said timer length;

wherein a remediation is performed of said at least one issue in said target computer system to prevent said attack, and thereby causes said improving of said target computer system.

9. The crowdsourced platform of claim 8, wherein said target computer system is an internet of things (IOT) device.

10. The crowdsourced platform of claim 9, wherein said IOT device is a smart-thermostat.

11. The crowdsourced platform of claim 8, wherein said timer length represents a response-time for a service level agreement (SLA) between said customer and said researcher.

12. The crowdsourced platform of claim 8, wherein said crowdsourced platform is hosted in one of a public, private and semi-private cloud.

13. The crowdsourced platform of claim 8, wherein one or both of supervised and unsupervised machine learning are utilized during said third-party examination.

* * * * *